(12) United States Patent
Kamm et al.

(10) Patent No.: US 7,651,430 B2
(45) Date of Patent: Jan. 26, 2010

(54) MULTI-SPEED TRANSMISSION

(75) Inventors: Michael Kamm, Bodnegg (DE); Gabor Diosi, Friedrichshafen (DE); Josef Haupt, Tettnang (DE); Gerhard Gumpoltsberger, Friedrichshafen (DE); Peter Ziemer, Tettnang (DE); Martin Brehmer, Constance (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 399 days.

(21) Appl. No.: 11/811,397

(22) Filed: Jun. 7, 2007

(65) Prior Publication Data

US 2007/0287573 A1    Dec. 13, 2007

(30) Foreign Application Priority Data

Jun. 8, 2006    (DE) .................. 10 2006 026 595

(51) Int. Cl.
    *F16H 3/62*    (2006.01)
(52) U.S. Cl. .................. 475/278; 475/275; 475/285; 475/330
(58) Field of Classification Search .................. 475/275, 475/278, 285, 330
    See application file for complete search history.

(56) References Cited

U.S. PATENT DOCUMENTS

| 6,176,803 B1 | 1/2001 | Meyer et al. |
| 6,634,980 B1 | 10/2003 | Ziemer |
| 6,960,149 B2 | 11/2005 | Ziemer |
| 6,976,930 B2 * | 12/2005 | Winzeler ............... 475/277 |
| 7,014,589 B2 | 3/2006 | Stevenson |
| 7,018,319 B2 | 3/2006 | Ziemer |
| 7,582,040 B2 * | 9/2009 | Kamm et al. ............ 475/277 |

FOREIGN PATENT DOCUMENTS

| DE | 42 34 572 A1 | 4/1994 |
| DE | 199 49 507 A1 | 4/2001 |
| DE | 100 83 202 T1 | 1/2002 |
| DE | 101 15 983 A1 | 10/2002 |
| DE | 101 15 995 A1 | 10/2002 |
| DE | 10 2004 029 952 A1 | 1/2005 |
| DE | 10 2005 002 337 A1 | 8/2006 |
| DE | 10 2005 010 210 A1 | 9/2006 |

* cited by examiner

*Primary Examiner*—David D Le
*Assistant Examiner*—Derek D Knight
(74) *Attorney, Agent, or Firm*—Davis & Bujold, P.L.L.C.

(57) ABSTRACT

The ring gear of the second gearset (RS2) and the input shaft couple to form a first shaft (1). The carrier of third gearset (RS3) and the output shaft form a second shaft (2). The sun gears of first and fourth gearsets (RS1, RS4) form a third shaft (3). The carrier of first gearset (RS1) forms a fourth shaft (4). Sun gears of second and third gearsets (RS2, RS3) form a fifth shaft (5). Ring gears of first and third gearsets (RS1, RS3) form a six shaft (6). The carriers of second and fourth gearsets (RS2, RS4) form a seventh shaft (7). A ring gear of fourth gearset (RS4) forms an eighth shaft (8). In the direction of power flow, First and second shifting elements (A), (B) are located between shafts (3, 4) and a transmission housing, third shifting element (C) is between two of shafts (1, 5, 7), fourth and fifth shifting elements (D), (E) are between shafts (6, 8), (5, 8).

32 Claims, 6 Drawing Sheets

| GEAR | ENGAGED SHIFTING ELEMENTS | | | | | RATIO $i$ | STEP $\varphi$ |
|---|---|---|---|---|---|---|---|
| | BRAKE | | CLUTCH | | | | |
| | A | B | C | D | E | | |
| 1 | ● | ● | ● | | | 4.70 | |
| | | | | | | | 1.53 |
| 2 | ● | ● | | | ● | 3.08 | |
| | | | | | | | 1.46 |
| 3 | | ● | ● | | ● | 2.10 | |
| | | | | | | | 1.24 |
| 4 | | ● | | ● | ● | 1.69 | |
| | | | | | | | 1.29 |
| 5 | | ● | ● | ● | | 1.31 | |
| | | | | | | | 1.31 |
| 6 | | | ● | ● | ● | 1.00 | |
| | | | | | | | 1.21 |
| 7 | ● | | ● | ● | | 0.82 | |
| | | | | | | | 1.26 |
| 8 | ● | | | ● | ● | 0.65 | |
| | | | | | | | TOTAL |
| R | ● | ● | | ● | | -2.94 | 7.18 |

Fig. 4

MULTI-SPEED TRANSMISSION

This application claims priority from German patent application serial no. 10 2006 026 595.5 filed Jun. 8, 2006.

FIELD OF THE INVENTION

The invention concerns a multi-speed transmission of planetary construction, especially an automatic transmission for a motor vehicle, comprising an input shaft, an output shaft, four planetary gearsets, at least eight rotary shafts, as well as five shifting elements, whose selective engagement produces various gear ratios between the input shaft and the output shaft, so that eight forward gears and at least one reverse gear can be implemented.

BACKGROUND OF THE INVENTION

According to the prior art, automatic transmissions, especially for motor vehicles, comprise planetary gearsets that are shifted by means of friction elements or shifting elements, such as clutches and brakes, and are usually connected to a starting element that is subjected to a slip effect and is selectively provided with a lockup clutch, such as a hydrodynamic torque converter or a fluid clutch.

Within the scope of DE 101 15 983 A1 of the applicant, for example, a multi-speed transmission is described comprising an input shaft, which is connected to a front-mounted gear set, an output shaft, which is connected to a rear-mounted gear set, and a maximum of seven shifting elements, whose selective shifting allows at least seven forward gears to be shifted into without a range shift. The front-mounted gear set consists of one shiftable or non-shiftable planetary gearset or a maximum of two non-shiftable, mutually coupled planetary gearsets. The rear-mounted gear set is configured as a two-carrier, four-shaft transmission with two shiftable planetary gearsets, and has four free shafts. The first free shaft of this two-carrier, four-shaft transmission is connected to the first shifting element, the second free shaft is connected to the second and third shifting elements, the third free shaft is connected to the fourth and fifth shifting elements, and the fourth free shaft is connected to the output shaft. For a multi-speed transmission with a total of six shifting elements, it is proposed according to this prior invention to additionally connect the third free shaft or the first free shaft of the rear-mounted gear set to a sixth shifting element. For a multi-speed transmission with a total of seven shifting elements, it is proposed according to this prior invention to additionally connect the third free shaft to a sixth shifting element, and to additionally connect the first free shaft to a seventh shifting element.

Several other multi-speed transmissions are known, for example, from German Patent 101 15 995 A1 of the applicant, in which four shiftable, mutually coupled planetary gearsets and six or seven frictionally engaging shifting elements are provided, whose selective engagement allows a rotational speed of an input shaft of the transmission to be transmitted to an output shaft of the transmission in such a way that nine or eleven forward gears and at least one reverse gear can be shifted into. Two or three shifting elements are engaged in each gear according to the schematic diagram, while during a change from one gear to the respectively following higher or lower gear, only one engaged shifting element is disengaged in order to prevent range shifting, and a previously disengaged shifting element is engaged.

In the related unpublished patent application DE 102005002337.1 of the applicant, a multi-speed transmission is furthermore proposed with an input shaft, an output shaft, four mutually coupled separate planetary gearsets, and five shifting elements, in which eight forward gears can be shifted into without range shifting, that is, in such a way that during a change from one forward gear into the following higher or lower forward gear, respectively only one of the previously engaged shifting elements is disengaged and only one of the previously disengaged gears is engaged. The multi-speed transmission also has a reverse gear. Three shifting elements are respectively engaged in all forward gears and in the reverse gear. With respect to the kinematic coupling of the four planetary gearsets among each other and to the input shaft and output shaft, it is provided that a carrier of the fourth planetary gearset and the input shaft are connected to each other and form a first shaft of the transmission, a carrier of the third planetary gearset and the output shaft are connected to each other and form a second shaft of the transmission, a sun gear of the first planetary gearset and a sun gear of the fourth planetary gearset are connected to each other and form a third shaft of the transmission, a ring gear of the planetary gearset forms a fourth shaft of the transmission, a ring gear of the second planetary gearset and a sun gear of the third planetary gearset are connected to each other and form a fifth shaft of the transmission, a carrier of the first planetary gearset and a ring gear of the third planetary gearset are connected to each other and form a sixth shaft of the transmission, a sun gear of the second planetary gearset and a ring gear of the fourth planetary gearset are connected to each other and form a seventh shaft of the transmission, and a carrier of the second planetary gearset forms an eighth shaft of the transmission. With regard to the kinematic coupling of the five shifting elements to the four planetary gearsets and to the input shaft and output shaft, it is provided that the first shifting element is arranged in the direction of power flow between the third shaft and a housing of the transmission, the second shifting element is arranged between the fourth shaft and the housing of the transmission, the third shifting element is arranged between the first and fifth shafts, the fourth shifting element is arranged either between the eighth and second shafts or between the eighth and the sixth shafts, and the fifth shifting element is arranged either between the seventh and fifth shafts or between the seventh and eighth shafts or between the fifth and eighth shafts.

Automatically shiftable motor vehicle transmissions of planetary construction have already been frequently described in the prior art and are being continuously developed and improved. These transmissions should have a sufficient number of forward gears as well as one reverse gear with a transmission ratio having a high overall spread as well as very advantageous progressive ratios, which are well suited for motor vehicles. They should further enable a high startup transmission ratio in the forward direction, and should include a direct gear and should be suitable for use in passenger cars as well as in commercial vehicles. Furthermore, these transmissions should require a low construction expenditure, in particular a small number of shifting elements, and should prevent double shifting in sequential shifting mode, so that only one shifting element is changed during shifting into the defined gear groups.

SUMMARY OF THE INVENTION

It is an object of the invention to propose a multi-speed transmission of the type mentioned above having at least eight forward gears that can be shifted into without range shifting and at least one reverse gear, in which the lowest possible number of shifting elements is required when utilizing a total of four planetary gearsets. The transmission should, in addition, have a large ratio spread with comparatively harmonious gear gradation and an advantageous efficiency at least in the main travel gears, that is, have comparatively low drag and gearing losses.

The multi-speed transmission of planetary construction according to the invention is based on the schematic diagram of the related patent application DE 102005002337.1 of the applicant and has an input shaft, an output shaft, four mutually coupled planetary gearsets, at least eight rotary shafts, as well as five shifting elements (two brakes and three clutches), whose selective engagement produces various gear ratios between the input shaft and the output shaft, so that eight forward gears and one reverse gear can be realized. Three of the five shifting elements are engaged at all times in each gear, while only one of the previously engaged shifting elements is disengaged and only one of the previously disengaged shifting elements is engaged during a change from one forward gear into the next following higher and lower forward gear.

It is proposed, according to the invention, that:
- a ring gear of the second planetary gearset and the input shaft are permanently connected to each other and form the first shaft of the transmission,
- a carrier of the third planetary gearset and the output shaft are permanently connected to each other and form the second shaft of the transmission,
- a sun gear of the first planetary gearset and a sun gear of the fourth planetary gearset are permanently connected to each other and form the third shaft of the transmission,
- a carrier of the first planetary gearset forms the fourth shaft of the transmission,
- a sun gear of the second planetary gearset and a sun gear of the third planetary gearset are permanently connected to each other and form the fifth shaft of the transmission,
- a ring gear of the first planetary gearset and a ring gear of the third planetary gearset are permanently connected to each other and form the sixth shaft of the transmission,
- a carrier of the second planetary gearset and a carrier of the fourth planetary gearset are permanently connected to each other and form the seventh shaft of the transmission,
- a ring gear of the fourth planetary gearset forms the eighth shaft of the transmission,
- the first shifting element is arranged within the power flow between the third shaft and a housing of the transmission,
- the second shifting element is arranged within the power flow between the fourth shaft and the housing of the transmission
- the third shifting element is arranged within the power flow either between the first and fifth shafts or between the first and seventh shafts or between the fifth and seventh shafts of the transmission,
- the fourth shifting element is arranged within the power flow between the sixth and eighth shafts of the transmission, and
- the fifth shifting element is arranged within the power flow between the fifth and eighth shafts of the transmission.

The multi-speed transmission of the invention thus differs from the related multi-speed transmission according to DE 102005002337.1 in that a ring gear of the second planetary gearset and the input shaft are permanently connected to one another as the first shaft of the transmission, the fourth shaft of the transmission is henceforth formed by the carrier of the first planetary gearset, the sun gears of the second and third planetary gearsets are henceforth permanently connected to each other as the fifth shaft of the transmission, the ring gears of the first and third planetary gearsets are henceforth permanently connected to each other as the sixth shaft of the transmission, the carriers of the second and fourth planetary gearsets are henceforth permanently connected to each other as the seventh shaft of the transmission, the ring gear of the fourth planetary gearset henceforth forms the eighth shaft of the transmission, the third shifting element can henceforth be arranged in the direction of power flow selectively also between the first and seventh shafts or also between the fifth and seventh shafts of the transmission, the fourth shifting element is henceforth arranged in the direction of powerflow always between the sixth and eighth shafts of the transmission, and the fifth shifting element is arranged henceforth in the direction of power flow always between the fifth and eight shafts of the transmission.

As in the related multi-speed transmission in accordance with DE 102005002337.1, it also applies for the multi-speed transmission that the first forward gear is achieved by engaging the first, second and third shifting elements, the second forward gear is achieved by engaging the first, second and fifth shifting elements, the third forward gear is achieved by engaging the second, third and fifth shifting elements, the fourth forward gear is achieved by engaging the second, fourth and fifth shifting elements, the fifth forward gear is achieved by engaging second, third and fourth shifting elements, the sixth forward gear is achieved by engaging the third, fourth and fifth shifting elements, the seventh forward gear is achieved by engaging the first, third and fourth shifting elements, the eighth forward gear is achieved by engaging the first, fourth and fifth shifting elements, and the reverse gear is achieved by engaging the first, second and fourth shifting elements.

Three of the four planetary gearsets are configured as so-called negative planetary gearsets, whose respective planetary gears mesh with the sun gear and ring gear of the respective planetary gearset. One of the four planetary gearsets (specifically the first planetary gearset) is configured as a so-called positive planetary gearset with mutually meshing inner and outer planetary gears, wherein these inner planetary gearsets also mesh with the sun gear of this plus planetary gearset, and these outer planetary gearsets also mesh with the ring gear of this plus planetary gearset. With regard to the spatial arrangement of the four planetary gearsets within the housing of the transmission, it is proposed in an advantageous embodiment to arrange the four planetary gearsets coaxially side by side in a "first, fourth, second, third planetary gearset" sequence.

The spatial arrangement of the shifting elements of the multi-speed transmission of the invention within their transmission housing is basically restricted only by the dimensions and the external configuration of the transmission housing. Numerous suggestions with regard to the spatial arrangement and constructive design of the shifting elements can be inferred, for example, from the related patent application DE 102005002337.1.

In a variation that is advantageous for a standard drive with regard to the arrangement of the shifting elements, it can thus be provided, for example, that the first and the second shifting elements are arranged from a spatial perspective at least in part within an area located radially above the first or fourth planetary gearsets. The third shifting element, which is provided according to the transmission diagram in order to lock the second planetary gearset, can be arranged from a spatial perspective, for example, at least in part within an area located axially between the fourth and second planetary gearsets, especially adjacent to the second planetary gearset. The fifth shifting element can be arranged from a spatial perspective at least in part within the area located axially between the second and third planetary gearsets, especially adjacent to the second planetary gearset. The fourth shifting element can also be arranged at least in part within an area located axially between the second and third planetary gearsets, especially adjacent to the third planetary gearset. According to the transmission diagram, a mutual disk carrier can be provided for the fourth and fifth shifting elements in a manner that is advantageous from the point of view of production, wherein the disk sets of the fourth and fifth shifting elements can be arranged radially superimposed as well as also axially side by side. However, it can also be provided that the fourth shifting element is arranged from a spatial perspective at least in part within an area located axially between the first and fourth planetary gearsets, wherein the disk set of the fourth shifting element can also be arranged in this case at least in part radially over the fourth planetary gearset.

Gear ratios with a great overall spread in harmonic gear gradation suited for passenger cars are obtained especially by means of the embodiment of the multi-speed transmission of the invention. Furthermore, the construction expense is comparatively low with the multi-speed transmission of the invention because a small number of shifting elements, namely two brakes and three clutches. A good efficiency is obtained, on the one hand, with the multi-speed transmission according to the invention as a consequence of the low drag losses, since only two shifting elements are not engaged in each gear, and on the other hand, as a consequence of the low gearing losses in the simply designed individual planetary gearsets.

In addition to this, it is also advantageously possible with the multi-speed transmission of the invention to carry out a startup with a hydrodynamic converter, with an external starting clutch, or with other suitable external starting elements. It is also conceivable to enable the startup process with a starting element that is incorporated into the transmission. One of the two brakes actuated in the first and second forward gears and in the reverse gear is preferably suitable for this purpose.

The multi-speed transmission of the invention is moreover designed in such a way that adaptability to different power train configurations within the direction of power flow as well as from the spatial point of view is made possible. Thus it is possible, for example, without special constructive measures, to arrange the input and output of the transmission selectively coaxially or axially parallel to each other.

For an application in which the input shaft and output shaft run coaxially with respect to each other, it is appropriate, for example, that the first planetary gearset is the gearset of the planetary gearset group according to the invention closest the input of the transmission. For an application in which the input shaft and output shaft run axially parallel or at an angle in relation to each other, the first or the third planetary gearset can be arranged on the side of the transmission housing closest the transmission drive motor that is operatively connected to the input shaft.

In connection with the proposed spatial arrangement of the four planetary gearsets coaxially side by side in the "first, fourth, second, third planetary gearset" sequence and the proposed spatial arrangement of the five shifting elements within the transmission housing, it is advantageously possible with regard to the design that only two of the four planetary gearsets are respectively centrally passed through in an axial direction by at most by one shaft of the transmission. In connection with the arrangement of the input and output shafts running coaxially toward each other, for example, the first and fourth planetary gearsets are centrally passed through by only the first shaft of the transmission. In connection with the arrangement of the input and output shafts running axially parallel or at an angle with respect to each other and the first planetary gearset that is close to the drive motor, the first and fourth planetary gearsets are passed through centrally by only the first shaft of the transmission. In connection with the arrangement of the input and output shafts axially parallel or at an angle with respect to each other and the third planetary gearset close to the drive motor it can be provided, for example, that only the second and third planetary gearsets are centrally passed through by only one shaft of the transmission, namely by only the first shaft of the transmission. The constructive design of the pressure and lubricant supply to the servos of the individual shifting elements is accordingly simple in all of these cases.

In all cases, the third shaft of the transmission, which is formed in some sections by the sun gears of the first and fourth planetary gearsets, can be rotatably mounted on a hub, which is fixed on the transmission housing. If the first planetary gearset faces the input of the transmission, this aforementioned housing-mounted hub is a component of the input-side transmission housing wall; otherwise it is a component of the housing wall lying opposite the drive motor.

BRIEF DESCRIPTION OF THE DRAWINGS

The invention will be explained in greater detail below with reference to the examples depicted in the drawings. Identical or similar components are provided with identical reference numerals.

In the drawings:

FIG. 4 shows an exemplary schematic diagram and exemplary gear ratios of the multi-speed transmission according to FIGS. 1, 2 and 3.

DETAILED DESCRIPTION OF THE PREFERRED EMBODIMENTS

Figure 1:
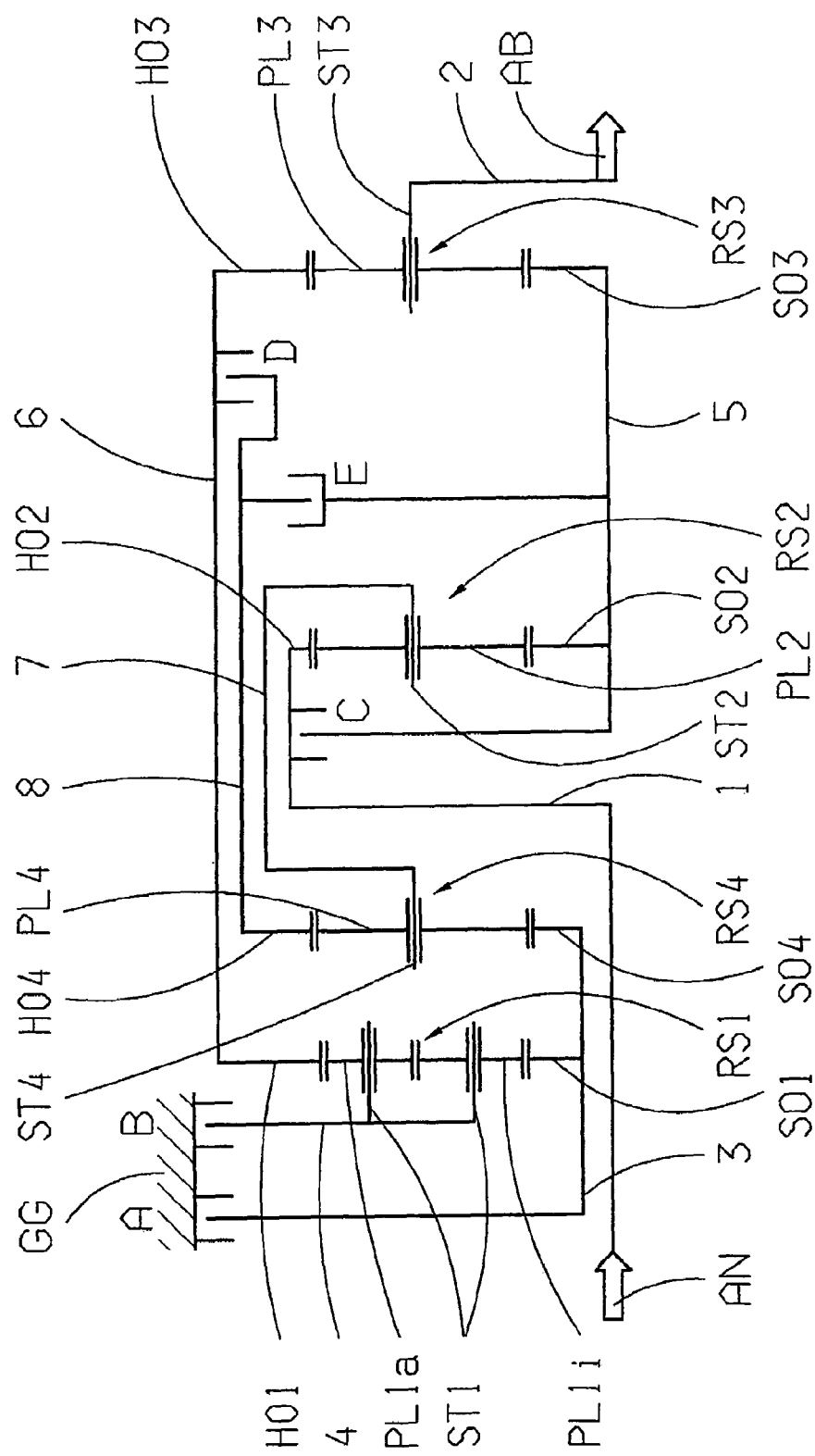
FIG. 1 shows a schematic representation of a first exemplary embodiment of a multi-speed transmission according to the invention.

FIG. 1 shows a first exemplary embodiment of a multi-speed transmission according to the invention in schematic representation. The transmission comprises an input shaft AN and an output shaft AB as well as four planetary gearsets RS1, RS2, RS3, RS4 and five shifting elements A, B, C, D, E, which are all arranged within a housing GG of the transmission. The four planetary gearsets RS1, RS2, RS3, RS4 are arranged in this exemplary embodiment coaxially one behind the other in the sequential order "RS1, RS4, RS2, RS3" in the axial direction. The planetary gearset RS1 is a simple positive planetary gearset in double planetary configuration. A positive planetary gearset is known to have mutually meshing inner and outer planetary gears, wherein these inner planetary gears also mesh with the sun gear of this planetary gearset, and these outer planetary gears also mesh with the ring gear of this planetary gearset. The ring gear of the planetary gearset RS1 is identified with HO1, the sun gear is identified with SO1, the inner planetary gears are identified with PL1$i$, the outer planetary gears are identified with PL1$a$, and the carrier, on which the inner and outer planetary gears PL1$i$, PL1$a$ are rotatably mounted, is identified with ST1. The other three planetary gearsets RS2, RS3 and RS4 are configured as simple negative planetary gearsets. A negative planetary gearset is known to have planetary gears that mesh with sun and ring gears of this planetary gearset. The ring gears of the planetary gearsets RS2, RS3, RS4 are identified with HO2, HO3 and HO4, the sun gears are identified with SO2, SO3 and SO4, the planetary gears are identified with PL2, PL3 and PL4, and the carriers on which the mentioned planetary gears are rotatably mounted are identified with ST2, ST3 and ST4. The shifting elements A and B are configured as brakes, which in the represented exemplary embodiment are both form-locking, shiftable disk brakes, but can also, of course, have another configuration as friction-locking shiftable band brakes, or, for example, also as form-locking shiftable claw or cone brakes. The shifting elements C, D and E are configured as clutches, which in the depicted exemplary embodiment are all form-locking, shiftable disk clutches, but which can, of course, also be configured in another embodiment as positive, shiftable claw or cone clutches, for example. A selective shifting of eight forward gears and at least one reverse gear can be realized with these five shifting elements A to E. The multi-speed transmission of the invention has a total of at least eight rotatable shafts, which are identified with reference numerals 1 through 8.

The following is provided with regard to the kinematic coupling of the individual elements of the four planetary gearsets RS1, RS2, RS3, RS4 among each other and to the input shaft AN and the output shaft AB: The ring gear HO2 of the second planetary gearset RS2 and the input shaft AN are permanently connected to each other as shaft 1. The carrier ST3 of the third planetary gearset RS3 and the output shaft AB are permanently connected to each other as shaft 2. The sun gears SO1, SO4 of the first and fourth planetary gearsets RS1, RS4 are permanently connected to each other as shaft 3. The coupled carrier ST1 of the first planetary gearset RS1 forms the shaft 4. The sun gears SO2, SO3 of the second and third planetary gearsets RS2, RS3 are permanently connected to each other as shaft 5. The ring gears HO1, HO3 of the first and third planetary gearsets RS1, RS3 are permanently connected to each other as shaft 6. The carriers ST2, ST4 of the second and fourth planetary gearsets RS2, RS4 are permanently connected to each other as shaft 7. The ring gear HO4 of the fourth planetary gearset RS4 forms the shaft 8.

The following is provided with regard to the kinematic coupling of the five shifting elements A through E to the shafts 1 to 8 of the transmission described in this way in connection with the multi-speed transmission according to FIG. 1: The brake A is arranged as the first shifting element in the direction of the power flow between the shaft 3 and a housing GG of the transmission. The brake B is arranged as the second shifting element in the direction of the power flow between the shaft 4 and the housing GG. The clutch C is arranged as the third shifting element in the direction of the power flow between the shaft 1 and the shaft 5, and in the activated or engaged status connects the sun gear SO2 and the ring gear HO2 of the second planetary gearset RS2 to each other. The clutch D is arranged as the fourth shifting element in the direction of the power flow between the shaft 6 and the shaft 8. The clutch E is arranged as the fifth shifting element in the direction of the power flow between the shaft 5 and the shaft 8.

In the exemplary embodiment shown in FIG. 1, the first planetary gearset RS1 is the gear set of the transmission that is positioned closest to the input, and the third planetary gearset RS3 is the gear set of the transmission positioned closest to the output, wherein the input shaft AN and the output shaft AB are arranged, for example, coaxially with respect to each other. The person skilled in the art can easily see that this transmission can be modified without particular effort, so that the input shaft and the output shaft are no longer arranged coaxially with respect to each other, but are arranged, for example, axially parallel or at an angle with respect to each other. With an arrangement such as this, the person skilled in the art will also be able to arrange the input of the transmission closest to the third planetary gearset RS3, if required, that is, on the side of the third planetary gearset RS3 that faces away from the first planetary gearset RS1.

The spatial arrangement of the shifting elements of the exemplary embodiment of a multi-speed transmission according to the invention depicted in FIG. 1 can be freely selected in principle, and is limited only by the dimensions and the outer shape of the transmission housing GG.

In the exemplary embodiment shown in FIG. 1, the two brakes A, B are arranged from a spatial perspective within the area of the first planetary gearset RS1, which is closest to the input herein, and thus axially side by side, wherein the kinematic connection of the two brakes A, B on the first planetary gearset RS1 causes the brake B to be arranged closer to the fourth planetary gearset RS4, which is adjacent to the first planetary gearset RS1, than the brake A, or causes the brake A to be arranged closer to the input of the transmission than the brake B. From a spatial perspective, the brake B is arranged at least in part within an area located radially above the first planetary gearset RS1, and the brake A is correspondingly arranged on the side of the first planetary gearset RS1 (closest to the input) that faces away from the fourth planetary gearset RS4. An inner disk carrier of the brake A forms a section of the shaft 3 of the transmission and is connected in a rotationally fixed manner with its sun gear SO1 on the side of the first planetary gearset RS1 that faces away from the fourth planetary gearset RS4. Sections of the shaft 3 are configured as a kind of sun shaft, which connects the sun gears SO1, SO4 of the planetary gearsets RS1, RS4 to each other. In this connection, the shaft 3 can be pivotably mounted both on the input shaft AN and on a hub that is closest to the transmission housing (not depicted in greater detail in FIG. 1). An inner disk carrier of the brake B is connected in a rotationally fixed manner as shaft 4 of the transmission to the carrier ST1 of the first planetary gearset RS1. The servos that are necessary for the actuation of the friction elements of the two brakes A, B are not depicted in greater detail in FIG. 1 for the sake of simplicity and can be incorporated, for example, into the transmission housing GG or into a housing cover that is fixed to the transmission housing, or can also be axially displaceably mounted.

The person skilled in the art will modify this exemplary spatial arrangement of the two brakes A, B as needed without particular inventive effort. The brake A can thus also be arranged, for example, at least in part radially above the first planetary gearset RS1, and the brake B can be arranged at least in part radially above the fourth planetary gearset RS4. In still another embodiment, both brakes A, B can also be arranged, for example, radially above each other and axially adjacent to the first planetary gearset RS1 on its side that is further from the fourth planetary gearset RS4, whereupon the brake B is then arranged, for example, over a larger diameter than the brake A.

As can also be seen in FIG. 1, the clutch C that is provided for blocking the second planetary gearset RS2 is arranged in a spatial perspective within an area located axially between the fourth and second planetary gearsets RS4, RS2 adjacent to the second planetary gearset RS2. An outer disk carrier of the clutch C herein forms a section of the shaft 1 of the transmission and is connected in a rotationally fixed manner, on the one hand, to the ring gear HO2 of the second planetary gearset RS2 or the side closest this second planetary gearset RS2 and, on the other hand, or the side further away from the second planetary gearset RS2 to the input shaft AN of the transmission. An inner disk carrier of the clutch C forms a section of the shaft 5 of the transmission and is connected in a rotationally fixed manner to the sun gear SO2 of the second planetary gearset RS2, which in turn is permanently connected in a rotationally fixed manner to the sun gear HO4 of the third planetary gearset RS3. The servo required for the actuation of the disk set of the clutch C is not shown in further detail in FIG. 1 for reasons of simplification. The shaft 7 formed as a coupling shaft between the carriers ST2, ST4 of the planetary gearsets RS2, RS4 overlaps, over its axial span, the planetary gearset RS2 and the clutch C, and is consequently connected in a rotationally fixed manner with the carrier ST2 on the side of the second planetary gearset RS2 further from the fourth planetary gearset RS4 and is connected in a rotationally fixed manner with the carrier ST4 on the side of the fourth planetary gearset closest the second planetary gearset RS2

As can also be seen in FIG. 1, the other two clutches D, E (at least their disk sets) are arranged in a spatial perspective within an area located between the second and third planetary gearsets RS2, RS3. The servos required for actuation of the respective disk sets of the clutches D, E are not shown in detail in FIG. 1 for reasons of simplification. In the exemplary embodiment that is shown, the disk sets of the two clutches D, E are arranged axially side by side, while the disk set of the cutch D is arranged closer to the third planetary gearset RS3 than the disk set of the clutch E.

The clutch E is located adjacent the second planetary gearset RS2. An outer disk carrier of the clutch E forms a section of shaft 8 of the transmission and is connected in a rotationally fixed manner with the ring gear HO4 of the fourth planetary gearset RS4, on one hand, on the side of clutch E facing the second planetary gearset RS2 or on the side of clutch E facing away from the third planetary gearset RS3. On the other hand, the mentioned outer disk carrier of the clutch E is connected in a rotationally fixed manner, on a side of clutch E facing away from the second planetary gearset RS2 or on a side of clutch E facing the third planetary gearset RS3, to an inner disk carrier of the clutch D, which likewise forms a section of the shaft 8. The shaft 7 is radially completely overlapped in an axial direction over its span by the shaft 8. An inner disk carrier of the clutch E forms a section of the shaft 5 of the transmission and is connected in a rotationally fixed manner to the coupling shaft 5, which connects the two sun gears SO2, SO3 of the planetary gearsets RS2, RS3 to each other. Accordingly, the two inner disk carriers of the clutches C, E are also permanently connected to each other. An outer disk carrier of the clutch D forms a section of the shaft 6 and is further connected in a rotationally fixed manner at its side that faces the third planetary gearset RS3, to ring gear HO3 and is connected in a rotationally fixed manner at the side of clutch D facing the third planetary gearset RS3, to the ring gear HO1 of the first planetary gearset RS1. Therein, the shaft 8 and thus also the planetary gearsets RS4, RS2 and the clutches C, E are completely radially overlapped in an axial direction over the span of the shaft 6, which is a coupling shaft between the two ring gears HO1, HO3 of the planetary gearsets RS1, RS3. It is easy for the person skilled in the art to see that the inner disk carrier of the clutch D and the outer disk carrier of the clutch E can be configured as a one-piece component.

The servo that is necessary for the actuation of the disk set of the clutch E can be axially displaceably mounted, for example, on the inner disk carrier of the clutch E, which will then rotate permanently at the rotational speed of the shaft 5. However, the servo of the clutch E can also be arranged within the cylinder chamber formed by the outer disk carrier of the clutch E, and can be axially displaceably mounted on the outer disk carrier of the clutch E, and will then permanently rotate at the rotational speed of the shaft 8. In order to equalize the rotational pressure of the rotating pressure chamber of this servo, the clutch E can be provided with dynamic pressure equalization in a known manner.

The servo that is necessary for actuation of the disk set of the clutch D can be arranged, for example, within the cylinder chamber formed by the outer disk carrier of the clutch D, can be axially displaceably mounted on the outer disk carrier of the clutch D, and permanently rotate at the rotational speed of the shaft 6. The servo of the clutch D can also be axially displaceably mounted on the outer disk carrier of the clutch D, and permanently rotate at the rotational speed of the shaft 8. In order to equalize the rotational pressure of the rotating pressure chamber of this servo, the clutch E can, of course, also be provided with dynamic pressure equalization in a known manner.

In a constructive configuration that deviates from FIG. 1, for example, the disk sets of the two clutches D, E can, however, be arranged in a spatial perspective at least in part radially superimposed. In this case, the disk set of the clutch D can preferably be arranged in a spatial perspective at least in part over the disk set of the clutch D.

It is easy for the person skilled in the art to see that the spatial arrangement of the clutch D within the transmission housing GG can be comparatively easily modified with respect to the exemplary embodiment shown in FIG. 1. In this way, in a configuration that deviates from FIG. 1, it is provided, for example, that the clutch D is arranged in a spatial perspective at least in part within an area located axially between the first planetary gearset RS1 (shown herein, for example, near the input) and the fourth planetary gearset RS4. In order to depict a constructively simple pressure and lubrication supply to the pressure chamber and the pressure equalization chamber of the servo of the clutch D via the coupling shaft of the two sun gears SO1, SO4 and the hub mounted on the housing, on which this coupling shaft is rotatably mounted, it is practical in this case to arrange at least the servo of the clutch D at least for the most part within the area located axially between the planetary gearsets RS1, RS4. The disk set of the clutch D, in contrast, can in this case also be arranged in a spatial perspective within an area located radially over the fourth planetary gearset RS4 or even within an area located radially over the clutch C or radially over the second planetary gearset RS2.

It should be expressly indicated that the above-described arrangement of the three clutches C, D, E should only be viewed as an example. If required, the person skilled in the art will also modify this exemplary spatial arrangement of the three clutches C, D, E; numerous suggestions for this can be derived, for example, from the related patent application DE 102005002337.1.

Figure 2:
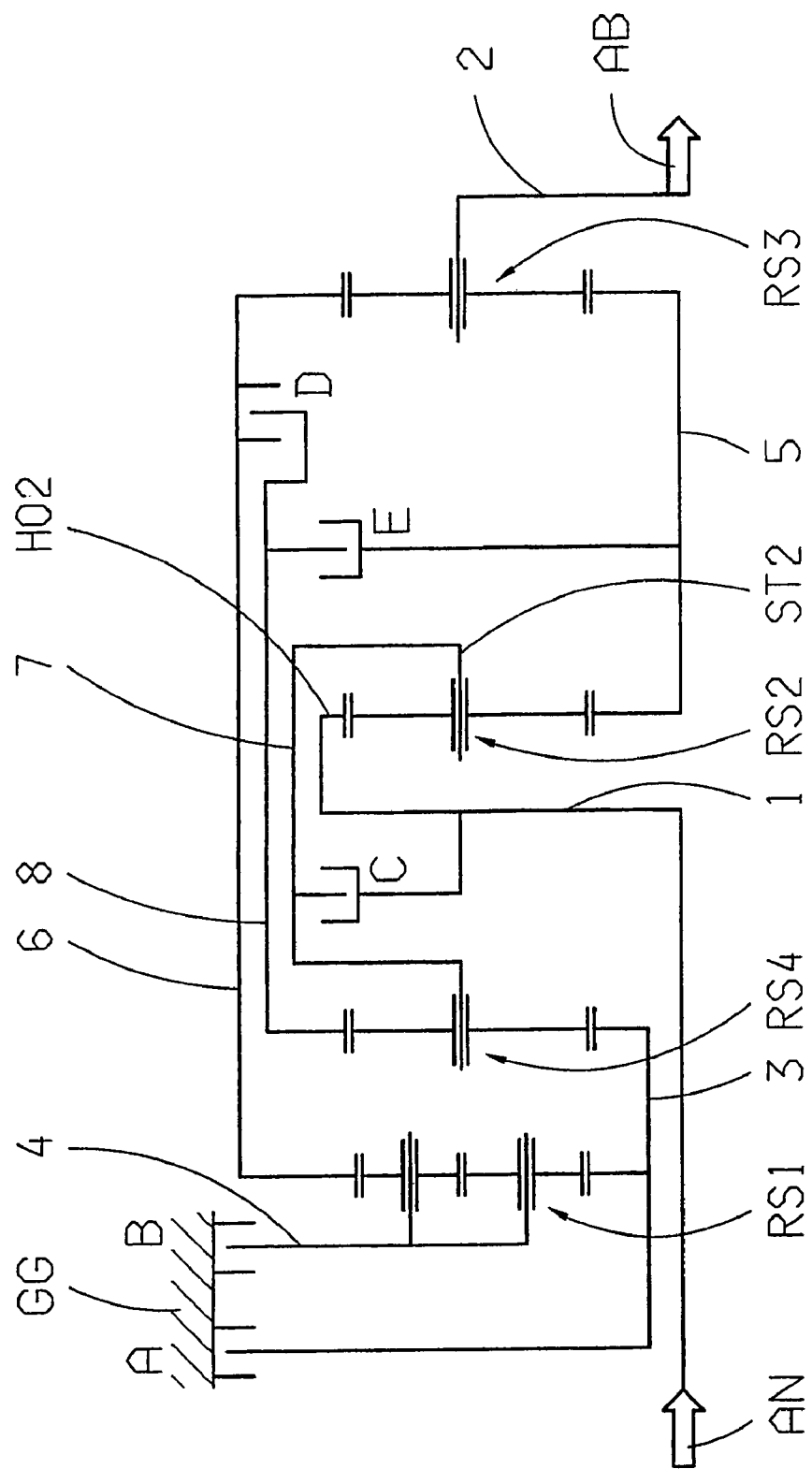
FIG. 2 shows a schematic representation of a second exemplary embodiment of a multi-speed transmission according to the invention.

Two other possibilities for locking the mentioned second planetary gear RS2 by means of the mentioned clutch C are disclosed in the following two exemplary embodiments of a multi-speed transmission according to the invention based on the idea that the clutch C, acting as the third shifting element of the transmission, locks the second planetary gearset RS2 in the activated or engaged status. FIG. 2 shows a second exemplary embodiment and FIG. 3 shows a third exemplary embodiment of a multi-speed transmission according to the invention, once more in simplified schematic representation; both are based on the first exemplary embodiment that was described in detail with reference to FIG. 1.

It can be easily seen in FIG. 2 that the single difference of the second exemplary embodiment of a multi-speed transmission according to the invention, which is shown herein, from that of FIG. 1 is that the clutch C is henceforth arranged in the direction of the power flow between the shaft 1 and the shaft 7. In the activated or engaged status, the clutch C mutually connects the ring gear HO2 and the carrier ST2 of the second planetary gearset RS2.

Figure 3:
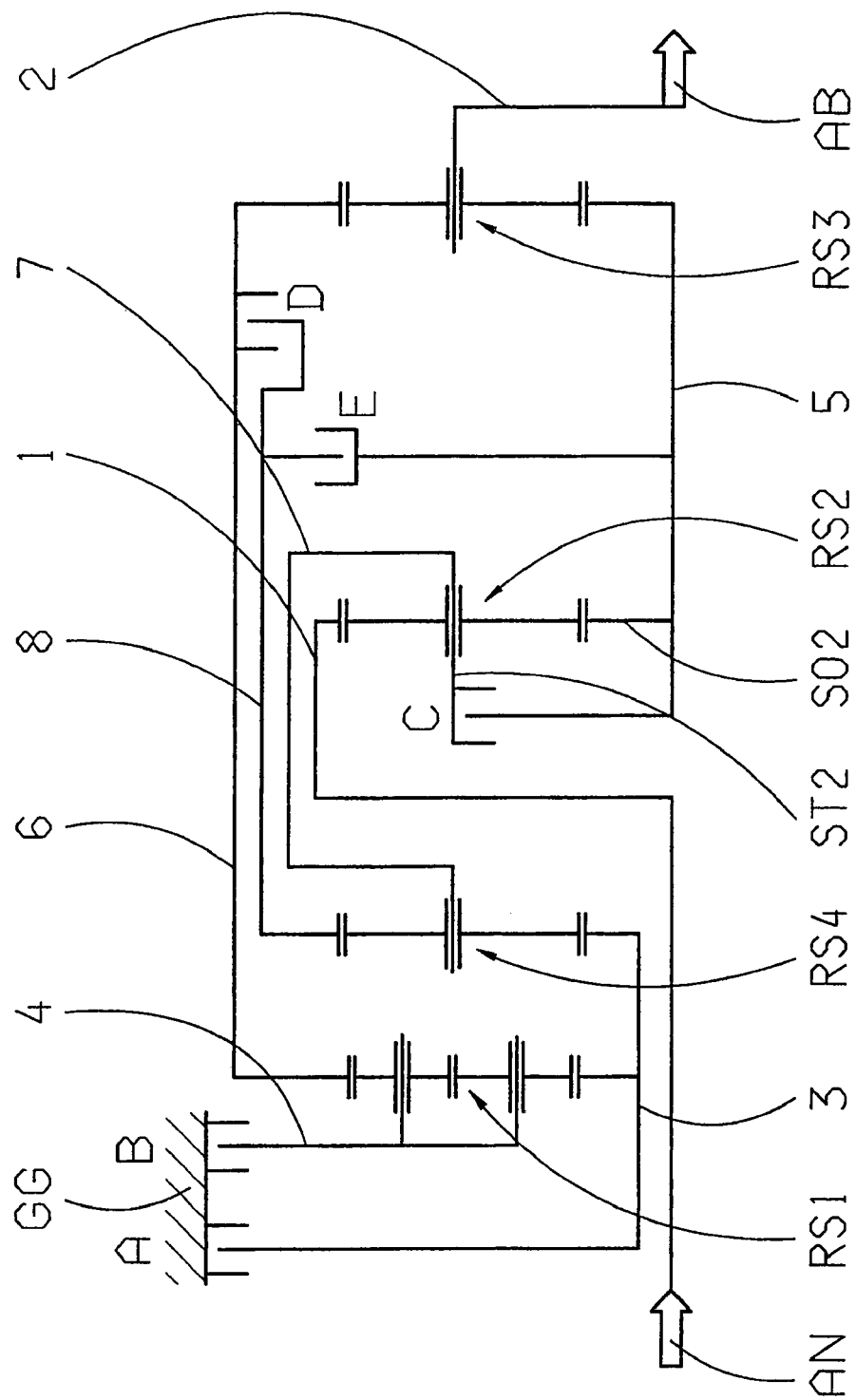
FIG. 3 shows a schematic representation of a third exemplary embodiment of a multi-speed transmission according to the invention.

In can also be easily seen in FIG. 3 that the single difference of the third exemplary embodiment of a multi-speed transmission according to the invention, which is shown herein, from that of FIG. 1 consists in that the clutch C is arranged in the direction of the power flow between the shaft 5 and the shaft 7. Consequently, in the activated or engaged status, the clutch C connects the sun gear SO2 and the carrier ST2 of the planetary gearset RS2 to each other.

FIG. 4 shows an exemplary schematic diagram, which can be provided for the multi-speed transmission of the invention according to FIGS. 1, 2 and 3. Three shifting elements are engaged and two shifting elements are disengaged in each gear. In addition to the shifting logic, exemplary values for the respective gear ratios i of the individual gears and the shift ranges φ to be determined based thereon can also be derived from the shifting diagram. The indicated gear ratios result from the (typical) stationary transmission gear ratios for the four planetary gearsets RS1, RS2, RS3, RS4 of plus 3.00, minus 1.60, minus 3.70, and minus 3.70. It can furthermore be inferred from the shifting diagram that double shifting or range shifts can be prevented with the sequential shifting, since two gears that are adjacent in the shifting logic jointly utilize two shifting elements. The sixth gear is configured as a direct gear.

The first forward gear is achieved by engaging the brakes A and B and the clutch C, the second forward gear is achieved by engaging the brakes A and B and the clutch E, the third forward gear is achieved by engaging the brake B and the clutches C and E, the fourth forward gear is achieved by engaging the brake B and the clutches D and E, the fifth forward gear is achieved by engaging the brake B and the clutches C and D, the sixth forward gear is achieved by engaging the clutches C, D and E, the seventh forward gear is achieved by engaging the brake A and the clutches C and D, and the eighth forward gear is achieved by engaging the brake A and the clutches D and E. As it is further apparent from the shifting diagram, the reverse gear is achieved by engaging the brakes A and B and the clutch D.

According to the invention, a startup of the motor vehicle is possible with a shifting element that is incorporated into the transmission. For this purpose, especially suitable, is a shifting element, needed in the first forward gear as well as in the reverse gear, herein consequently preferably the brake A or the brake B. These two brakes A, B are advantageously also required in the second forward gear. If the brake B is used as a starting element that is incorporated into the transmission, even a startup in the first five forward gears and the reverse gear is possible therewith. As is apparent from the schematic diagram, the clutch C can also be used to start in the forward direction and the clutch D can be used as an internal transmission element to start in the reverse direction.

The following moreover applies to all the previously depicted or described exemplary embodiments of a multi-speed transmission of the invention:

Different gear progressions can also be achieved according to the invention with the same transmission diagram depending on the shifting logic of the individual planetary gearsets, so that a variation specifically adapted to the application and/or vehicle is made possible.

Figure 10:
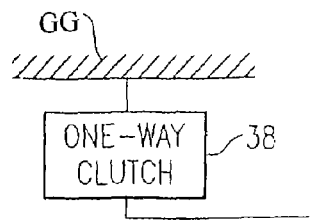
FIG. 10 is a diagrammatic view of an embodiment of the inventive multi-speed transmission having a one-way clutch.

It is moreover possible, as shown in FIG. 10, to provide additional one-way clutches 38 at any suitable place in the multi-speed transmission, for example between a shaft and the housing or if required in order to connect two shafts.

Figure 5:
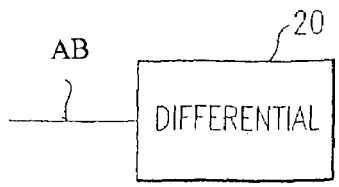
FIG. 5 is a diagrammatic view of an embodiment of the inventive multi-speed transmission having a differential.

An axle differential and/or a distributor differential 20 can be arranged on the input side or on the output side, as shown in FIG. 5.

Figure 6:
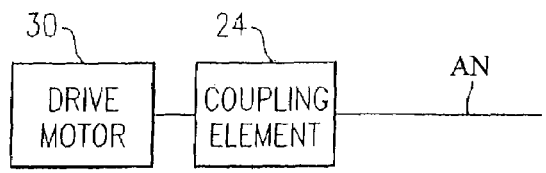
FIG. 6 is a diagrammatic view of an embodiment of the inventive multi-speed transmission with a coupling element and a drive motor.
Figure 7:
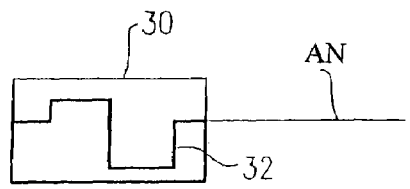
FIG. 7 is a diagrammatic view of an embodiment of the inventive multi-speed transmission with a crankshaft of the drive motor fixed to an input shaft of the multi-speed transmission.
Figure 14:
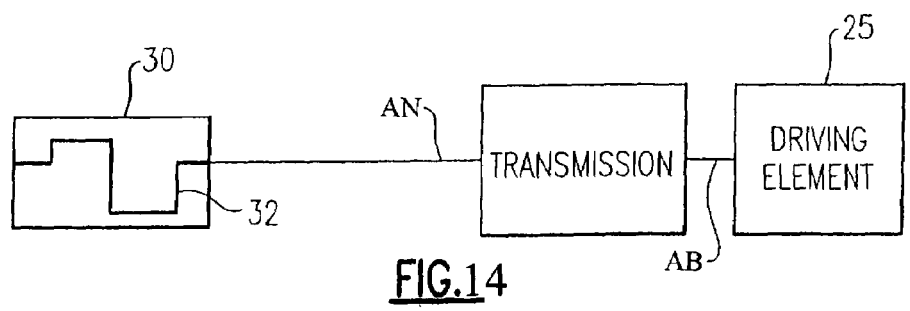
FIG. 14 is a diagrammatic view of another embodiment of the inventive multi-speed transmission with the crankshaft of the drive motor fixed to the input shaft of the multi-speed transmission and the coupling element located behind the multi-speed transmission.

Within the scope of an advantageous further development, shown in FIG. 6, the input shaft AN can be separated by a coupling element 24 of a drive motor 30, if needed, wherein a hydrodynamic converter, a hydraulic clutch, a dry startup clutch, a wet startup clutch, a magnetic powder clutch, or a centrifugal clutch can be used as such a coupling element. It is also possible, as shown in FIG. 14, to arrange a driving element 25 of this type in the direction of the power flow behind the transmission, wherein in this case, the input shaft AN is permanently connected to the crankshaft 32 of the drive motor 30, as shown in FIG. 7.

Figure 8:
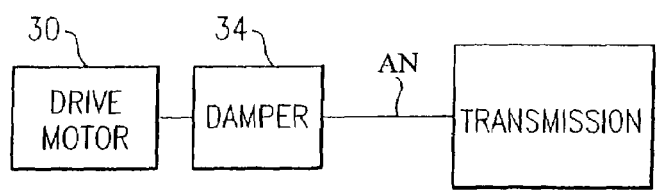
FIG. 8 is a diagrammatic view of an embodiment of the inventive multi-speed transmission having the drive motor communicating with a damper.

The multi-speed transmission of the invention and shown in FIG. 8, moreover makes possible the arrangement of a torsion vibration damper 34 between the drive motor 30 and the transmission.

Figure 9:
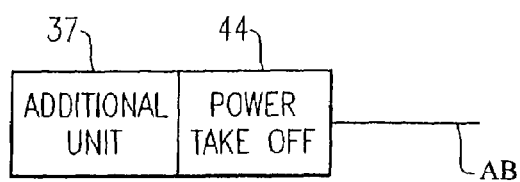
FIG. 9 is a diagrammatic view of an embodiment of the inventive multi-speed transmission with a power take-off for driving an additional unit.
Figure 12:
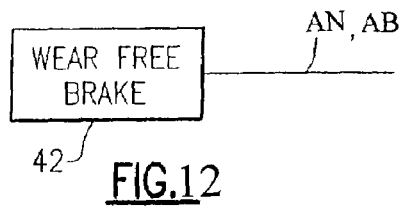
FIG. 12 is a diagrammatic view of a preferred design of the inventive multi-speed transmission having a wear free brake.
Figure 13:
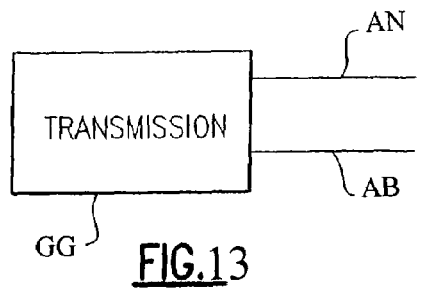
FIG. 13 is a diagrammatic view of a further embodiment of the invention with the input and the output being provided on the same side of the multi-speed transmission housing.

Within the scope of a further embodiment of the invention, as shown in FIG. 12, a wear-free brake 42, such as, for example, a hydraulic or an electric retarder or the like, can be arranged on each shaft, preferably on the input shaft AN or on the output shaft AB, which is of particular significance for use in commercial motor vehicles. In addition, a power take-off 44 can be provided, as shown in FIG. 9, on any shaft, preferably on the input shaft AN or the output shaft AB, in order to drive additional units 36. Additionally, as shown in FIG. 13, the input and output are provided on the same side of the housing GG.

The shifting elements that are used can be configured as power-shift clutches or power-shift brakes. Friction-locking clutches or friction-locking brakes, such as, for example, disk clutches, band brakes and/or cone clutches, can be used.

Moreover, positive brakes and/or positive clutches, such as, for example, synchronizing mechanisms or claw clutches, can also be used as shifting elements.

Figure 11:
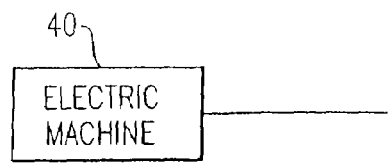
FIG. 11 is a diagrammatic view of an embodiment of the inventive multi-speed transmission with an electric machine.

Another advantage of the multi-speed transmission presented here in FIG. 11, is that an electric machine 40 can be mounted as a generator and/or as an additional drive motor on each shaft.

Any embodiment configuration, in particular any spatial arrangement of the planetary gearsets and the shifting elements per se, as well as with respect to each other, is understood to be covered under the protective scope of the claims, as long as it is practical from a technical point of view and does not influence the function of the transmission as disclosed in the claims, even if these embodiments are not explicitly depicted in the FIGS. or described in the disclosure.

REFERENCE SYMBOLS 1 first shaft
2 second shaft
3 third shaft
4 fourth shaft
5 fifth shaft
6 sixth shaft
7 seventh shaft
8 eighth shaft
A first shifting element, first brake
B second shifting element, second brake
C third shifting element, first clutch
D fourth shifting element, second clutch
E fifth shifting element, third clutch
AB output shaft
AN input shaft
GG housing
RS1 first planetary gearset
HO1 ring gear of the first planetary gearset
SO1 sun gear of the first planetary gearset
ST1 carrier of the first planetary gearset
PL1i inner planetary gears of the first planetary gearset
PL1a outer planetary gears of the first planetary gearset
RS2 second planetary gearset
HO2 ring gear of the second planetary gearset
SO2 sun gear of the second planetary gearset
ST2 carrier of the second planetary gearset
PL2 planetary gears of the second planetary gearset
RS3 third planetary gearset
HO3 ring gear of the third planetary gearset
SO3 sun gear of the third planetary gearset
ST3 carrier of the third planetary gearset
PL3 planetary gears of the third planetary gearset
RS4 fourth planetary gearset
HO4 ring gear of the fourth planetary gearset
SO4 sun gear of the fourth planetary gearset
ST4 carrier of the fourth planetary gearset
PL4 planetary gears of the fourth planetary gearset
i gear ratio
φ progression ratio

The invention claimed is:

1. A multi-speed automatic transmission of a planetary design for a motor vehicle, the transmission comprising:
an input shaft (AN),
an output shaft (AB);
first, second, third and fourth planetary gearsets (RS1, RS2, RS3, RS4), and each of the first, the second, the third and the fourth planetary gearsets (RS1, RS2, RS3, RS4) comprising a sun gear, a carrier and a ring gear;
at least first, second, third, fourth, fifth, sixth, seventh and eighth rotatable shafts (1, 2, 3, 4, 5, 6, 7, 8) and first, second, third, fourth and fifth shifting elements (A, B, C, D, E), whose selective engagement creates different gear ratios between the input shaft (AN) and the output shaft (AB) so that eight forward gears and at least one reverse gear can be implemented;
wherein the ring gear (HO2) of the second planetary gear set (RS2) and the input shaft (AN) are permanently connected and form the first shaft (1);
the carrier (ST3) of the third planetary gear set (RS3) and the output shaft (AB) are permanently connected and form the second shaft (2);
the sun gear (SO1) of the first planetary gear set (RS1) and the sun gear (SO4) of the fourth planetary gear set (RS4) are permanently connected and form the third shaft (3);
the carrier (ST1) of the first planetary gearset (RS1) forms the fourth shaft (4);
the sun gear (SO2) of the second planetary gear set (RS2) and the sun gear (SO3) of the third planetary gear set (RS3) are permanently connected and form the fifth shaft (5);
the ring gear (HO1) of the first planetary gear set (RS1) and the ring gear (HO3) of the third planetary gear set (RS3) are permanently connected and form the sixth shaft (6);
the carrier (ST2) of the second planetary gear set (RS2) and the carrier (ST4) of the fourth planetary gear set (RS4) are permanently connected and form the seventh shaft (7);
the ring gear (HO4) of the fourth planetary gear set (RS4) forms the eighth shaft (8);
the first shifting element (A) is arranged between the third shaft (3) and a transmission housing (GG);
the second shifting element (B) is arranged between the fourth shaft (4) and transmission housing (GG);
the third shifting element (C) is arranged, in a direction of power flow, between one of the first shaft (1) and the fifth shaft (5), the first shaft (1) and the seventh shaft (7), and the fifth shaft (5) and the seventh shaft (7);
the fourth shifting element (D) is arranged, in the direction of the power flow, between the sixth shaft (6) and the eighth shaft (8); and
the fifth shifting element (E) is arranged, within the power flow, between the fifth shaft (5) and the eighth shaft (8).

2. The multi-speed transmission of claim 1, wherein a first forward gear is achieved by engaging the first shifting element (A), the second shifting element (B) and the third shifting element (C);
a second forward gear is achieved by engaging the first shifting element (A), the second shifting element (B) and the fifth shifting elements (E);
a third forward gear is achieved by engaging the second shifting element (B), the third shifting element (C) and the fifth shifting element (E);
a fourth forward gear is achieved by engaging the second shifting element (B), the fourth shifting element (D) and the fifth shifting element (E);
a fifth forward gear is achieved by engaging second shifting element (B), the third shifting element (C) and the fourth shifting element (D);
a sixth forward gear is achieved by engaging the third shifting element (C), the fourth shifting element (D) and the fifth shifting element (E);
a seventh forward gear is achieved by engaging the first shifting element (A), the third shifting element (C) and the fourth shifting element (D);

an eighth forward gear is achieved by engaging the first shifting element (A), the fourth shifting element (D) and the fifth shifting element (E); and the reverse gear is achieved by engaging the first shifting element (A), the second shifting element (B) and the fourth shifting element (D).

3. The multi-speed transmission of claim 1, wherein the second planetary gearset (RS2), the third planetary gearset (RS3) and the fourth planetary gearset (RS4) are all negative planetary gearsets, and the first planetary gearset (RS1) is a positive planetary gearset.

4. The multi-speed transmission of claim 1, wherein the first planetary gearset (RS1), the second planetary gearset (RS2), the third planetary gearset (RS3) and the fourth planetary gearset (RS4) are co-axial and arranged, in an axial direction, in a sequential order of:

the first planetary gearset (RS1), the fourth planetary gearset (RS4), the second planetary gearset (RS2), and the third planetary gearset (RS3).

5. The multi-speed transmission according to claim 1, wherein the input shaft (AN) is one of axially parallel and at an angle to the output shaft (AB), and one of the first planetary gearset (RS1) and the third planetary gearset (RS3) is located on a side of the transmission housing (GG) closest to a drive motor which is connected to the input shaft (AN) of the transmission.

6. The multi-speed transmission according to claim 1, wherein the input shaft (AN) is co-axial with the output shaft (AB), and the first planetary gearset (RS1) is located on a side of the transmission housing (GG) closest a drive motor which is connected to the input shaft (AN).

7. The multi-speed transmission according to claim 1, wherein no more than one shaft of the transmission passes, in an axial direction, through a center of each of the first planetary gearset (RS1), the second planetary gearset (RS2), the third planetary gearset (RS3) and the fourth planetary gearset (RS4).

8. The multi-speed transmission according to claim 7; wherein only the first shaft (1) transverses, in the axial direction, a center of each of up to two of the first planetary gearset (RS1), the second planetary gearset (RS2), the third planetary gearset (RS3) and the fourth planetary gearset (RS4).

9. The multi-speed transmission according to claim 1, wherein a hub rotationally supports the third shaft (3) and is fixed to the transmission housing (GG).

10. The multi-speed transmission according to claim 1, wherein at least one of the first shifting element (A) and the second shifting element (B) is located, in spatial terms, at least partially radially about one of the first planetary gearset (RS1) and the fourth planetary gearset (RS4).

11. The multi-speed transmission according to claim 1, wherein the first shifting element (A) is arranged, in spatial terms, axially parallel the second shifting element (B), and at least one friction element of the second shifting element (B) is located closer to the fourth planetary gearset (RS4) than a friction element of the first shifting element (A).

12. The multi-speed transmission according to claim 1, wherein one of the first shifting element (A) is at least partially located, in spatial terms, radially above the second shifting element (B) and the second shifting element (B) is at least partially located, in spatial terms, radially above the first shifting element (A).

13. The multi-speed transmission according to claim 1, wherein the third shifting element (C) is axially located, at least partially, between the fourth planetary gear set (RS4) and the second planetary gear set (RS2).

14. The multi-speed transmission according to claim 1; wherein the fifth shifting element (E) is axially located, at least partially, between the second planetary gearset (RS2) and the third planetary gearset (RS3)

15. The multi-speed transmission according to claim 1, wherein at least one of the third shifting element (C) and the fifth shifting element (E) is located axially adjacent the second planetary gear set (RS2).

16. The multi-speed transmission according to claim 1, wherein the fourth shifting element (D) is axially arranged, in spatial terms, at least partially between the second planetary gearset (RS2) and the third planetary gearset (RS3).

17. The multi-speed transmission according to claim 1, wherein the fourth shifting element (D) is axially located adjacent the third planetary gear set (RS3).

18. The multi-speed transmission according to claim 1, wherein one of a disc set of the fourth shifting element (D) is located, at least partially, radially above a disc set of the fifth shifting element (E) and the disc set of the fifth shifting element (E) is located, at least partially, radially above the disc set of the fourth shifting element (D).

19. The multi-speed transmission according to claim 1, wherein a disk set of the fourth shifting element (D) and a disk set of the fifth shifting element (E) are axially adjacent one another.

20. The multi-speed transmission according to claim 1, wherein the fourth shifting element (D) and the fifth shifting element (E) have a common disk carrier.

21. The multi-speed transmission according to claim 1, wherein the fourth shifting element (D) is at least partially located axially between the first planetary gear set (RS1) and the fourth planetary gear set (RS4).

22. The multi-speed transmission according to claim 1, wherein a disk set of the fourth shifting element (D) is located at least partially radially about the fourth planetary gear set (RS4).

23. The multi-speed transmission according to claim 1, wherein the sixth shaft (6) completely overlies, in an axial direction, the fourth planetary gearset (RS4), the second planetary gearset (RS2), the third shifting element (C) and the fifth shifting element (E).

24. The multi-speed transmission according to claim 1, wherein at least one one-way clutch is located between at least one of the input shaft (AN), the output shaft (AB), the first shaft (1), the second shaft (2), the third shaft (3), the fourth shaft (4), the fifth shaft (5), the sixth shaft (6), the seventh shaft (7) and the eighth shaft (8) and the transmission housing (GG).

25. The multi-speed transmission according to claim 1, wherein an input and an output of the transmission are provided on opposite sides of the housing (GG).

26. The multi-speed transmission according to claim 1, wherein an input and an output of the transmission are located on a common side of the housing (GG).

27. The multi-speed transmission according to claim 1, wherein at least one of an axle differential and a distributor differential is located on one of the input shaft (1) and the output shaft (2).

28. The multi-speed transmission according to claim 1, wherein a coupling element is located, in the direction of the power flow, between a drive motor and the input shaft (AN), and the coupling element is one of a hydrodynamic converter, a hydraulic clutch, a dry starting clutch, a wet starting clutch, a magnetic-power clutch and a centrifugal clutch.

29. The multi-speed transmission according to claim 1, wherein the vehicle is started via one of the first shifting element (A), the second shifting element (B), the third shifting element (C) and the fourth shifting element (D), and the input shaft (AN) is permanently connected to a crankshaft of a drive motor in one of a rotationally fixed manner and a rotationally elastic manner.

30. The multi-speed transmission according to claim 29, wherein the vehicle is started in at least one of a forward direction and a reverse direction via one of the first shifting element (A) and the second shifting element (B).

31. The multi-speed transmission according to claim 1, wherein one of a wear free brake, a power take-off for driving additional units, an electric machine is fixed to at least one of the input shaft (AN), the output shaft (AB), the first shaft (1), the second shaft (2), the third shaft (3), the fourth shaft (4), the fifth shaft (5), the sixth shaft (6), the seventh shaft (7) and the eighth shaft (8) of the transmission, and the electric machine is at least one of a generator and an additional drive unit.

32. The multi-speed transmission according to claim 1, wherein each of the first shifting element (A), the second shifting element (B), the third shifting element (C), the fourth shifting element (D) and the fifth shifting element (E) is one of a friction-locking clutch, a friction-locking brake, a disc clutch, a band brake and a conical clutch, a form-locking clutch, a form-locking brake, a conical clutch and a claw clutch.

* * * * *